Patented Oct. 9, 1928.

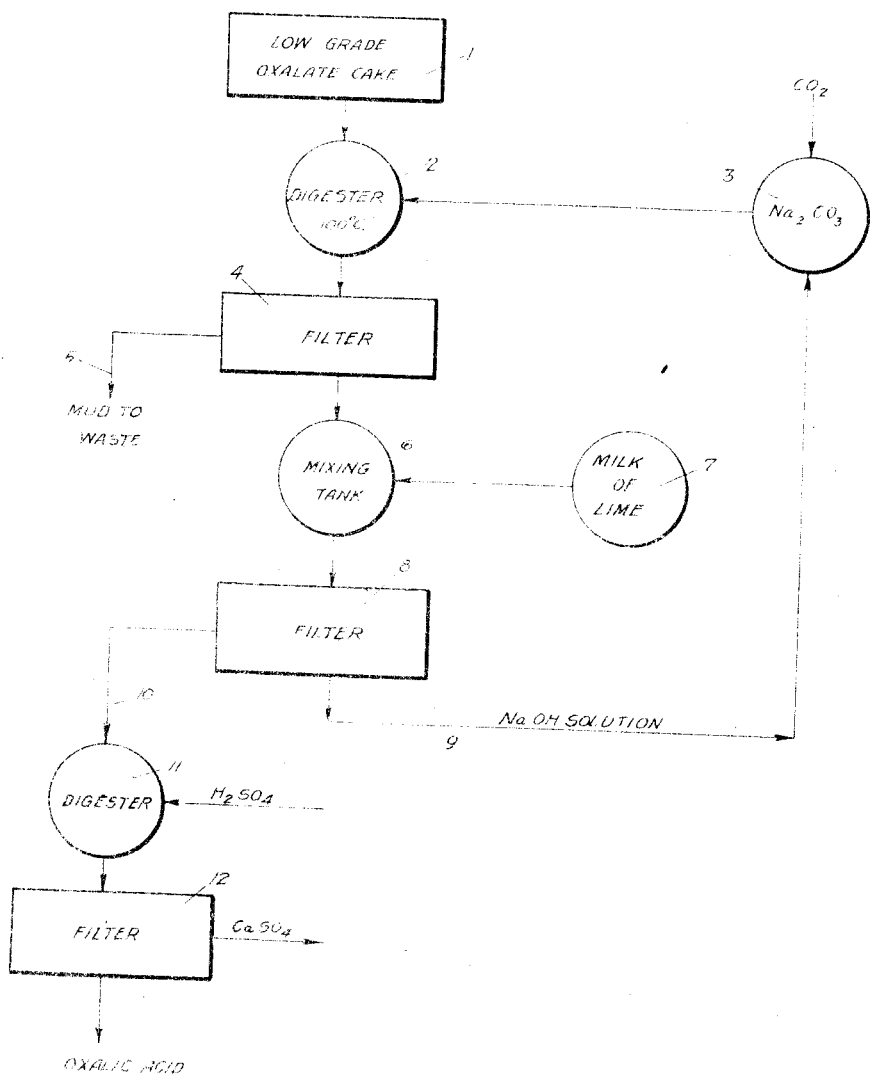

1,687,480

UNITED STATES PATENT OFFICE.

GUY H. BUCHANAN, OF WESTFIELD, NEW JERSEY, AND GEORGE BARSKY, OF NEW YORK, N. Y., ASSIGNORS TO AMERICAN CYANAMID COMPANY, OF NEW YORK, N. Y., A CORPORATION OF MAINE.

METHOD OF RECOVERING OXALATES.

Application filed September 4, 1924. Serial No. 735,757.

This invention relates to the manufacture of oxalates or oxalic acid and more particularly it is directed to improving the grade of crude oxalates.

In the copending application of Buchanan, Barsky and Ashley, filed Dec. 18th, 1923, Serial No. 681,446, for a process of producing salts of carboxylic acids and assigned to the American Cyanamid Company, there is described a new method of producing oxalates and oxalic acid. This method consists essentially in providing a mixture of a cyanamid and a cyanid, specifically the calcium salts thereof, and heating the same for a considerable length of time at a temperature corresponding to a steam pressure of about 100 pounds per square inch whereby a reaction takes place in which practically all of the nitrogen is recovered as ammonia while producing large amounts of calcium formate and calcium oxalate.

The formate being soluble, and the oxalate being insoluble, they may be readily separated by filtration. The oxalate present in the resulting filter cake contains large amounts of insoluble impurities such as calcium carbonate and calcium hydroxide. In many cases the amounts of such impurities may constitute 80% of the total mass. In order to recover oxalic acid therefrom, the mixture may be treated with a mineral acid, such as sulphuric acid, but the amount thereof necessary for the decomposition of the oxalate is relatively large because sufficient acid must be used to decompose the carbonate and the hydroxide as well.

It is, therefore, among the objects of this invention to provide an improved process of making oxalates and oxalic acid, which shall render unnecessary larger amounts of acid and thereby decrease the cost of producing these substances.

It is a further object of our invention to produce a high grade oxalate product from a material containing small percentages of oxalate.

We have discovered that calcium oxalate may be decomposed by sodium carbonate under conditions such that a complete separation of the oxalate from the carbonate and hydroxide may be effected. This decomposition may be represented by the following equation:

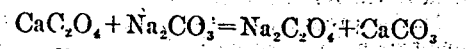

$CaC_2O_4 + Na_2CO_3 = Na_2C_2O_4 + CaCO_3$

The sodium oxalate which is formed is soluble and may be separated from the calcium carbonate by filtration. The solution thus obtained contains all the oxalate as sodium oxalate, together with whatever excess sodium carbonate was used in the extraction, and other soluble salts, either present originally or resulting from the reaction.

The proportion of sodium carbonate to calcium oxalate which must be used to effect this decomposition varies with the temperature at which the decomposition is caused to take place. Thus at 40° C. an excess of 72% of sodium carbonate, $Na_2CO_3$, over the theoretical amount as indicated by the above equation is necessary. At 100° C. an excess of 19% to 20% is sufficient, and at higher temperatures a still smaller excess is required.

The practical application of our invention may be illustrated in the treatment of a mixture containing calcium oxalate and calcium carbonate, with a large proportion of the latter compound, to produce a mixture containing a large proportion of calcium oxalate, and a small proportion of calcium carbonate. Such mixture before treatment may contain 20% calcium oxalate as the hydrated salt, $CaC_2O_4.H_2O$, and 80% calcium carbonate, $CaCO_3$. We may make a slurry of such a mixture with water, using sufficient water to produce a 3% solution of sodium oxalate, assuming that we secure complete decomposition of the calcium oxalate. To this slurry we add an amount of sodium carbonate, $Na_2CO_3$, equivalent to an excess of from 15% to 35% over the theoretical amount required to react with the calcium oxalate according to the following equation:

$CaC_2O_4.H_2O + Na_2CO_3 =$
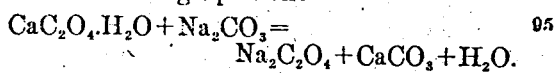
$Na_2C_2O_4 + CaCO_3 + H_2O.$

We now agitate and heat this mixture at the boiling temperature until all the calcium oxalate has been decomposed, as may be ascertained by testing a portion of the mixture at intervals. When all the calcium oxalate has been decomposed we filter the mixture hot and obtain a solution of sodium oxalate and sodium carbonate, the relative proportions of which will depend upon the excess of sodium carbonate used to effect the decomposition of the calcium oxalate. Thus if we use an excess of 25%, we may obtain a solution in which the sodium oxalate is about 80% of the dissolved salts, and sodium carbonate about 20%.

We may treat this solution to produce a mixture which may be used for the production of oxalic acid by reaction with sulphuric acid in the manner well known.

In the production of oxalic acid by treatment of an oxalate with sulphuric acid it is advantageous to have the oxalate combined with a base which forms an insoluble salt with sulphuric acid. We may therefore treat the solution of sodium oxalate and sodium carbonate with calcium hydroxide for example, and obtain a mixture containing a solution of sodium hydroxide, solid calcium oxalate, and solid calcium carbonate, which upon filtering yields a solution of sodium hydroxide and a cake containing calcium oxalate and calcium carbonate. We may now treat this cake with sulphuric acid for the production of oxalic acid in the manner well known and we may utilize the solution of sodium hydroxide for the production of sodium carbonate by treating it with carbon dioxide. The solution of sodium carbonate thus obtained we may return to the process and use for the treatment of other low grade calcium oxalate mixtures.

The composition of the final cake will obviously depend upon excess of sodium carbonate which is used in decomposing the calcium oxalate of the original mixture. As previously stated, an excess of 19% to 20% is sufficient when the extraction is carried out at 95° to 100° C. In filtering the mixture, however, some cooling may take place, as a result of which reversion may occur if only sufficient sodium carbonate has been used to effect the decomposition of the calcium oxalate at the boiling temperature. Consequently we find it desirable to add sufficient sodium carbonate to prevent reversion during the filtering operation. The amount which should be added to accomplish this result depends upon the temperature of the liquid during filtering, and obviously the temperature will vary with the different types of filtering equipment employed. When using equipment, the design of which does not permit the temperature of the liquid to fall below 85° C., we have found that an excess of 35% of sodium carbonate will prevent reversion, an excess which is 15% greater than is required to accomplish the decomposition at the boiling temperature.

Assuming, for example, that an excess of 33% of sodium carbonate is used in treating the original mixture in the foregoing illustration, a simple calculation shows that the said original mixture of 20% calcium oxalate, $CaC_2O_4.H_2O$, and 80% calcium carbonate, $CaCO_3$, may be transformed into a mixture containing substantially 80% $CaC_2O_4.H_2O$ and 20% $CaCO_3$, and we have consistently obtained this result in practice.

In the accompanying drawing, constituting a part hereof, the single figure is a diagrammatic view of a system for the production of oxalic acid by our new method.

We first provide a low grade oxalate cake 1, which may be made in accordance with the process of the above mentioned copending application or by any other method, and which contains generally about 20% of calcium oxalate. The cake 1 is mixed with water and run into the digester 2 where it is treated with a sodium carbonate solution from tank 3, in considerable excess. Generally the excess is from 10% to 35%. The mixture is digested at a temperature of about 100° C. forming a solution of sodium oxalate with an excess of sodium carbonate, the soluble material being separated from the insoluble calcium salts in the filter 4 which is maintained at as high a temperature as practical, generally between 80° and 90° C. The resulting precipitate 5 is allowed to go to waste.

The oxalate solution is then run into the mixing tank 6 where it is treated with milk of lime 7, or a crude oxalate cake high in free lime in order to re-precipitate calcium oxalate and incidentally convert the excess of sodium carbonate to sodium hydroxide. The material is then run into the filter 8, the filtrate 9 being mixed with the sodium carbonate solution in tank 3 to make up for losses, and is treated with $CO_2$ to regenerate sodium carbonate for use in the digester. The precipitate 10 contains about 80% of calcium oxalate and about 20% of calcium carbonate which is formed from the excess of sodium carbonate used at the digesting stage of the operation. This enriched precipitate is run into the digester 11 where it is treated with a sufficient amount of sulphuric acid to decompose the oxalate, forming oxalic acid, which is separated from the resulting insoluble calcium sulphate and other calcium compounds in filter 12.

In applying our process to mixtures containing calcium oxide or calcium hydroxide in addition to calcium carbonate we may proceed as follows:—We prepare a slurry of the mixture with water and add thereto an amount of sodium carbonate sufficient both to precipitate all the calcium hydroxide as calcium carbonate and to decompose the calcium oxalate as herein previously set forth. We now have a mixture which differs only from the corresponding mixture of the previously described modification in that it contains sodium hydroxide as one of the products of the interaction of calcium hydroxide and sodium carbonate. We may now proceed as set forth in the preceding modification and obtain a solution containing sodium oxalate, sodium carbonate and sodium hydroxide. This solution we may treat with calcium hydroxide in the manner previously disclosed and obtain a mixture containing calcium oxalate, calcium carbonate, and sodium hydroxide which upon filtering yields a solution of sodium hydroxide and a cake containing calcium oxalate and calcium carbonate, in which the proportion of oxalate to carbonate may be as previously stated.

In applying our process to mixtures containing both calcium carbonate and calcium oxide or calcium hydroxide, we may also proceed as follows,—this modification representing a different method of utilizing carbon dioxide in our process. We prepare a slurry of the mixture with water and add thereto an amount of sodium carbonate sufficient to decompose the calcium oxalate as hereinbefore set forth. At the same time we pass $CO_2$ gas through the slurry. This $CO_2$ may either precipitate the calcium hydroxide as calcium carbonate, or else may transform into sodium carbonate whatever sodium hydroxide has been formed by the interaction of calcium hydroxide with sodium carbonate. In any event the $CO_2$ added serves the purpose of precipitating calcium hydroxide and consequently makes it unnecessary to add an excess of sodium carbonate to the slurry for this purpose. The addition of $CO_2$ is discontinued as soon as all the calcium hydroxide has been precipitated and before any substantial portion of sodium carbonate has been transformed into sodium bicarbonate. We may now proceed as in the first modification and obtain a solution containing sodium oxalate and sodium carbonate, which may be treated with calcium hydroxide to produce a cake for the manufacture of oxalic acid.

It will be noted from the above description of our invention that we have taken a low grade oxalate cake containing approximately 20% of oxalate which would require a large excess of sulphuric acid, in the neighborhood of 400%, to recompose to oxalic acid. By our simple process of carbonating, filtering and treating with lime, we have so enriched the oxalate cake that it requires only a slight excess of sulphuric acid over the theoretical to produce oxalic acid therefrom. In large scale operations this represents a great saving in cost of materials. The sodium carbonate, although a relatively expensive material, is not lost in the process but is reused and therefore the cost thereof is no important factor in the cost of operation. As a final result we use $CO_2$, lime and sulphuric acid in our process,—the said materials being among the most inexpensive that can be obtained. Furthermore, our process does not require the services of exceptionally skilled operators since the steps of the process consist mainly in mixing and filtering operations which can readily be accomplished by the ordinary unskilled workers.

What we claim is:

1. The method of converting calcium oxalate into an alkali metal oxalate which comprises reacting on calcium oxalate with an alkali metal carbonate in the presence of water above 40° C., said alkali metal carbonate being present in an excess of about 15% to 35% over the theoretical required, and recovering a solution of alkali metal oxalate.

2. The method of converting calcium oxalate into an alkali metal oxalate which comprises reacting on calcium oxalate with an excess of an alkali metal carbonate in the presence of water at elevated temperatures, the said excess decreasing with increasing temperatures, and recovering a solution of an alkali metal oxalate.

3. The method of converting calcium oxalate into sodium oxalate which comprises reacting on calcium oxalate with sodium carbonate in the presence of water at elevated temperatures, said sodium carbonate being present in an excess of at least 19% to 20% over the theoretical required, and recovering a solution of sodium oxalate.

4. The method of recovering sodium oxalate from a mixture containing calcium oxalate and other insoluble calcium compounds which comprises forming a slurry of said mixture with water, adding sodium carbonate in at least 10% excess of the theoretical required to react with the calcium oxalate present, heating to above 95° C. and recovering a solution of sodium oxalate.

5. The method of transforming a low grade calcium oxalate mixture containing calcium carbonate and calcium hydroxide into a high grade calcium oxalate mixture, which comprises forming a slurry of said low grade mixture with water, adding sodium carbonate in an amount in excess of the theoretical required to react with the calcium oxalate and calcium hydroxide present, heating and agitating said slurry until the calcium oxalate has been transformed into sodium oxalate, filtering to recover a solution of sodium oxalate and other sodium salts, reacting upon last named solution with calcium hydroxide to precipitate the oxalate and carbonate as the calcium salts, filtering to recover a high grade calcium oxalate mixture, and treating the resulting filtrate with carbon dioxide to carbonate any sodium hydroxide therein, and returning the sodium carbonate thus produced to the process.

6. The method of recovering sodium oxalate from a mixture containing calcium oxalate and other insoluble calcium compounds which comprises forming a slurry of said mixture with water, adding sodium carbonate in at least 10% excess of the theoretical required to react with the calcium oxalate present, heating to above 40° C. and recovering a solution of sodium oxalate.

In testimony whereof, we have hereunto subscribed our names this 22 day of August 1924.

GUY H. BUCHANAN.
GEORGE BARSKY.